United States Patent
Foreman

(10) Patent No.: US 11,440,574 B2
(45) Date of Patent: Sep. 13, 2022

(54) POWERED WHEELBARROW ASSEMBLY

(71) Applicant: Gilbert Foreman, Newark, MD (US)

(72) Inventor: Gilbert Foreman, Newark, MD (US)

(*) Notice: Subject to any disclaimer, the term of this patent is extended or adjusted under 35 U.S.C. 154(b) by 338 days.

(21) Appl. No.: 16/824,113

(22) Filed: Mar. 19, 2020

(65) Prior Publication Data
US 2021/0291885 A1 Sep. 23, 2021

(51) Int. Cl.
*B62B 3/08* (2006.01)
*B62B 5/00* (2006.01)
*B62B 3/00* (2006.01)
*B62B 1/18* (2006.01)
*B62B 1/24* (2006.01)

(52) U.S. Cl.
CPC .............. *B62B 5/003* (2013.01); *B62B 3/002* (2013.01); *B62B 3/08* (2013.01); *B62B 5/0066* (2013.01); *B62B 5/0069* (2013.01); *B62B 1/186* (2013.01); *B62B 1/24* (2013.01)

(58) Field of Classification Search
CPC ......... B62B 1/186; B62B 1/24; B62B 5/0069; B62B 5/0066; B62B 5/003; B62B 3/08; B62B 3/002
See application file for complete search history.

(56) References Cited

U.S. PATENT DOCUMENTS

| | | | | |
|---|---|---|---|---|
| 2,253,288 A * | 8/1941 | De Lucchi | ................ | B62B 1/18 280/47.23 |
| 2,262,903 A * | 11/1941 | Peterson | ................... | B62B 1/24 298/3 |
| 2,533,549 A * | 12/1950 | Bell | ...................... | B62B 5/0026 298/17 R |
| 2,638,172 A * | 5/1953 | Borchin | ................ | B62B 5/0026 298/3 |
| 2,856,017 A * | 10/1958 | Overstreet | ............ | B62B 5/0026 180/343 |
| 2,918,133 A * | 12/1959 | Ericsson | ............... | B62B 5/0026 474/1 |
| 3,021,625 A * | 2/1962 | Stasse | ....................... | B62B 1/24 180/19.1 |
| 3,281,186 A * | 10/1966 | Davis | ....................... | B62D 1/14 298/2 |
| 3,323,837 A * | 6/1967 | Landry | ..................... | B62B 1/24 298/17.5 |
| 4,144,945 A * | 3/1979 | Hamilton | ............. | B62D 51/004 180/19.1 |

(Continued)

FOREIGN PATENT DOCUMENTS

WO    WO9943535    9/1999

*Primary Examiner* — Emma K Frick

(57) ABSTRACT

A powered wheelbarrow assembly includes a wheelbarrow that includes a frame and a bucket that is hingedly coupled to the frame. A pair of front wheels is each rotatably coupled to the frame to roll on a support surface. A pair of rear wheels is each pivotally coupled to the frame to roll on the support surface. Each of the rear wheels is rotatable about a vertical axis for steering the wheelbarrow. A motor is coupled to the frame and a drive unit is movably coupled to the frame. The drive unit is in mechanical communication between the motor and the front wheels such that the motor rotates the front wheels when the motor is engaged. In this way the motor reduces the effort required to transport a load in the wheelbarrow. A clutch is movably coupled to the frame for engaging and disengaging the drive unit.

9 Claims, 4 Drawing Sheets

(56) References Cited

U.S. PATENT DOCUMENTS

| | | | |
|---|---|---|---|
| 4,589,508 A * | 5/1986 | Hoover | B62B 1/24 |
| | | | 298/3 |
| 4,645,264 A * | 2/1987 | Morrison | B62D 51/005 |
| | | | 165/41 |
| 4,811,988 A * | 3/1989 | Immel | B62B 3/08 |
| | | | D34/16 |
| 5,211,254 A * | 5/1993 | Harris, III | B62B 5/0026 |
| | | | 280/47.23 |
| 5,284,218 A * | 2/1994 | Rusher, Jr. | B62D 51/04 |
| | | | 180/19.1 |
| 5,305,843 A * | 4/1994 | Armstrong | B62B 5/0026 |
| | | | D34/16 |
| 5,350,030 A * | 9/1994 | Mawhinney | B62B 5/0026 |
| | | | 180/215 |
| 6,065,555 A * | 5/2000 | Yuki | B62B 5/0026 |
| | | | 180/19.1 |
| 6,470,981 B1 * | 10/2002 | Sueshige | B60K 7/0007 |
| | | | 180/65.6 |
| D465,631 S | 11/2002 | Brant | |
| 6,659,565 B2 | 12/2003 | Brant | |
| 6,745,859 B2 * | 6/2004 | Simons | B62B 5/005 |
| | | | 180/19.1 |
| 6,793,236 B1 * | 9/2004 | Mitchell | B62B 5/005 |
| | | | 280/47.24 |
| 6,820,880 B2 * | 11/2004 | Benton | B62B 1/18 |
| | | | 298/3 |
| 6,955,404 B1 | 10/2005 | Best | |
| 9,108,690 B2 | 8/2015 | Rowland | |
| 9,120,499 B2 * | 9/2015 | Michel, Jr. | B62B 5/0036 |
| 9,463,730 B2 | 10/2016 | Romas | |
| 10,099,732 B2 | 10/2018 | Ho | |
| 10,384,704 B2 * | 8/2019 | Fielder | B62B 5/003 |
| 2003/0178801 A1 * | 9/2003 | Hart | B62B 1/20 |
| | | | 280/47.371 |
| 2007/0079998 A1 * | 4/2007 | Walter | B62B 1/20 |
| | | | 180/19.1 |
| 2007/0089917 A1 * | 4/2007 | Hartley | B62B 5/0026 |
| | | | 180/65.1 |
| 2010/0044125 A1 * | 2/2010 | Witzigman | B62D 51/065 |
| | | | 180/19.3 |
| 2021/0061333 A1 * | 3/2021 | Simons | B62B 3/12 |
| 2021/0291885 A1 * | 9/2021 | Foreman | B62B 3/08 |

* cited by examiner

POWERED WHEELBARROW ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wheelbarrow devices and more particularly pertains to a new wheelbarrow device for automatically transporting cargo in a wheelbarrow.

(2) Description of Related Art Including Information Disclosed Under 37 CFR 1.97 and 1.98

The prior art relates to wheelbarrow devices. The prior art discloses a powered wheelbarrow that includes a drive system which employs gears rotating about a vertical axis. The prior art discloses a motorized wheelbarrow that has a pivot point being centrally located on a bucket for enhancing tipping the bucket. The prior art discloses a motorized hand truck that can engage a wheelbarrow for transporting the wheelbarrow. The prior art discloses a powered wheelbarrow that includes a drive unit for tipping a bucket on the wheelbarrow. Additionally, the prior art discloses a powered wheelbarrow that has an electric motor. The prior art further discloses a powered wheelbarrow that includes an electric motor and a curved member for enhancing tipping the wheelbarrow.

BRIEF SUMMARY OF THE INVENTION

An embodiment of the disclosure meets the needs presented above by generally comprising a wheelbarrow that includes a frame and a bucket that is hingedly coupled to the frame. A pair of front wheels is each rotatably coupled to the frame to roll on a support surface. A pair of rear wheels is each pivotally coupled to the frame to roll on the support surface. Each of the rear wheels is rotatable about a vertical axis for steering the wheelbarrow. A motor is coupled to the frame and a drive unit is movably coupled to the frame. The drive unit is in mechanical communication between the motor and the front wheels such that the motor rotates the front wheels when the motor is engaged. In this way the motor reduces the effort required to transport a load in the wheelbarrow. A clutch is movably coupled to the frame for engaging and disengaging the drive unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
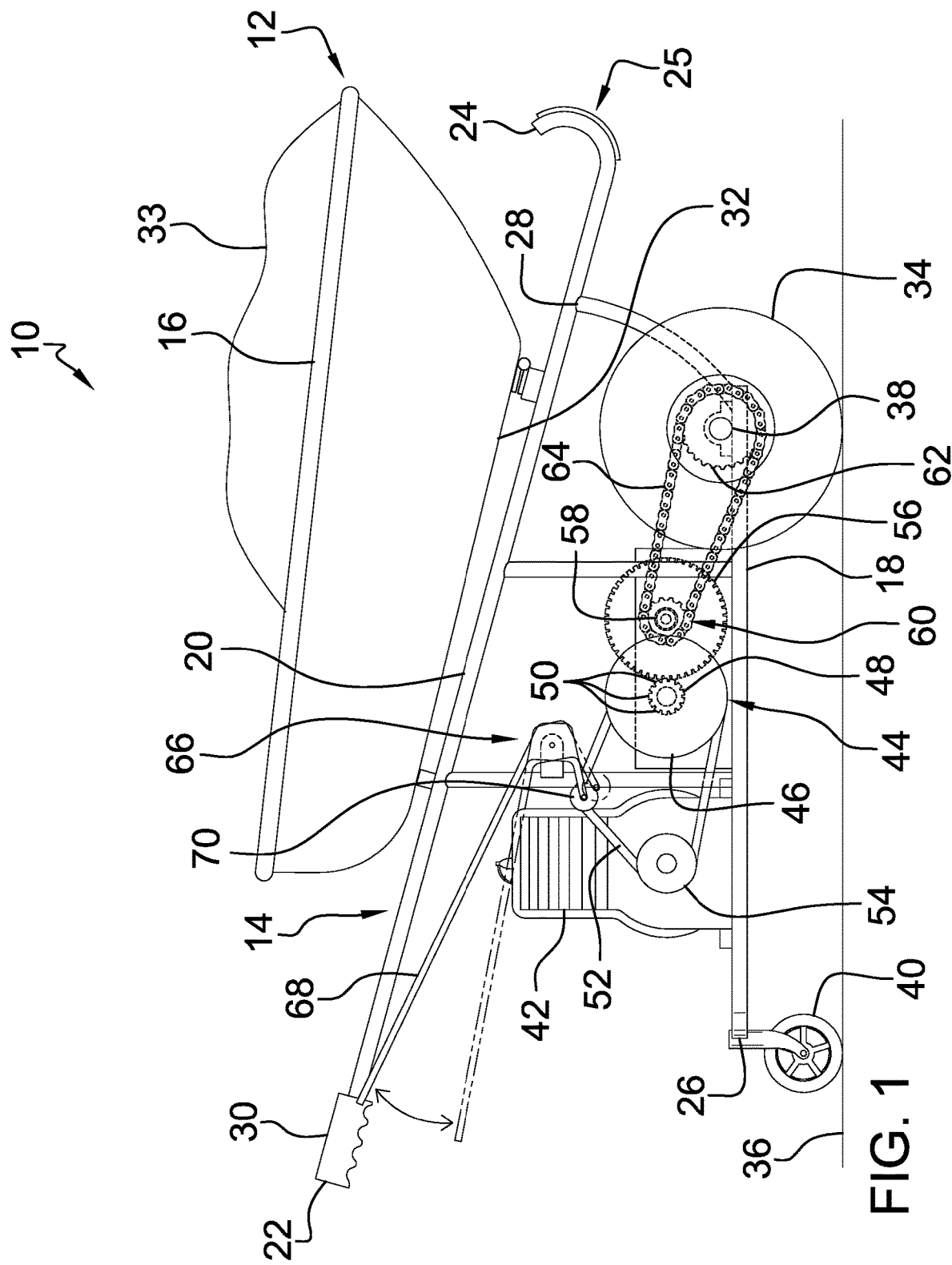
FIG. 1 is a right side phantom view of a powered wheelbarrow assembly according to an embodiment of the disclosure.
Figure 2:
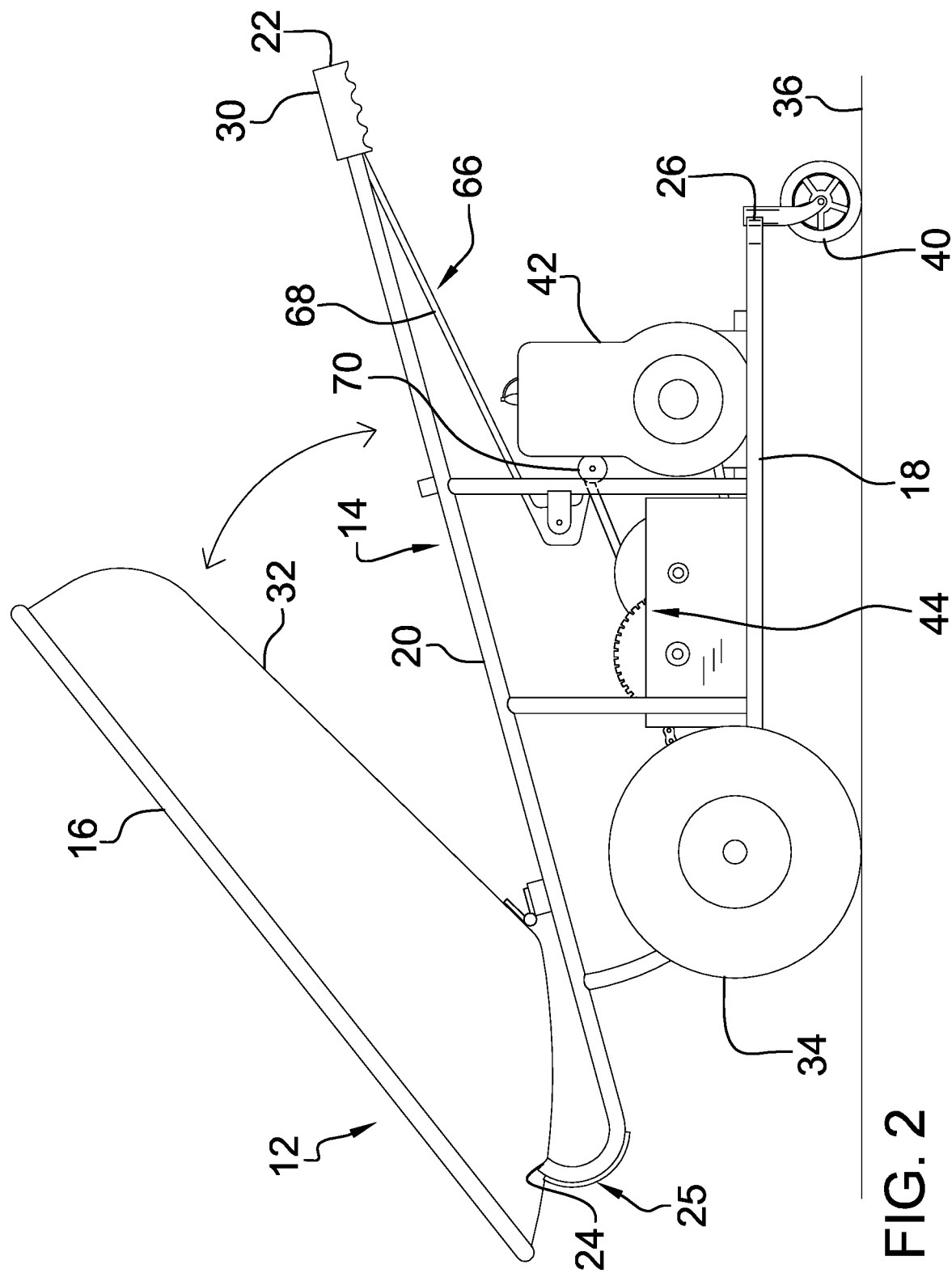
FIG. 2 is a left side view of an embodiment of the disclosure.
Figure 3:
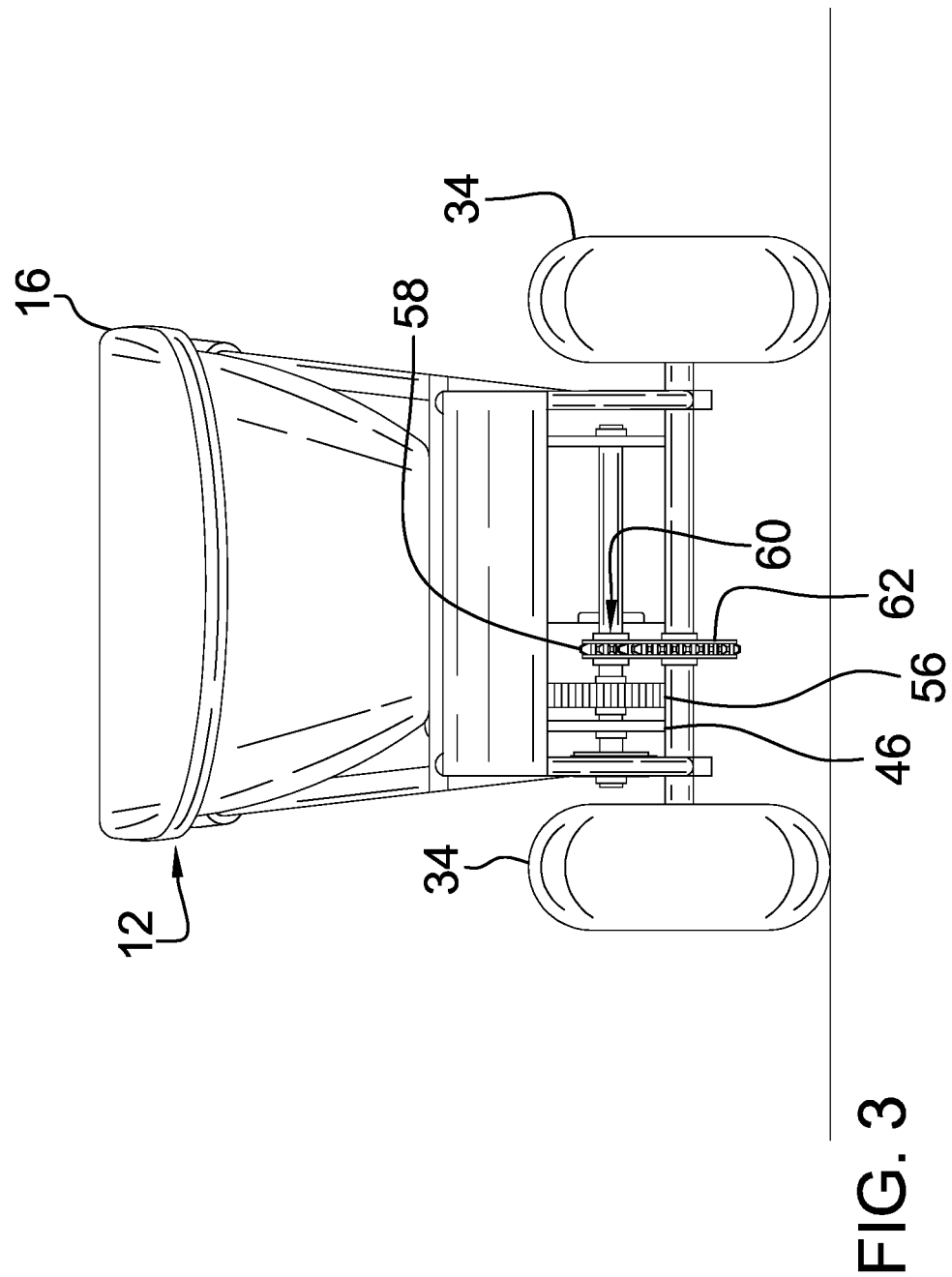
FIG. 3 is a front view of an embodiment of the disclosure.
Figure 4:
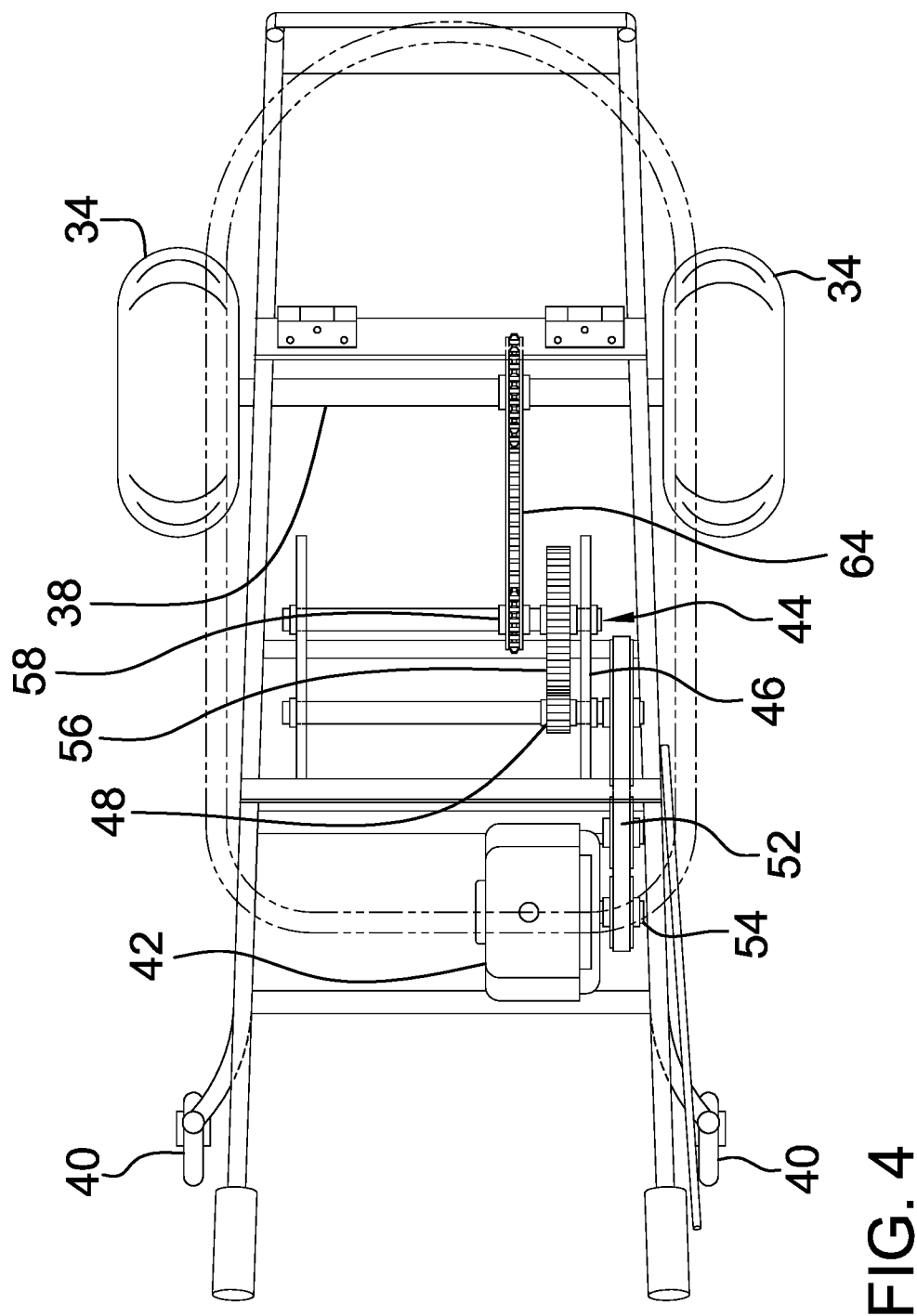
FIG. 4 is a bottom phantom view of an embodiment of the disclosure.

With reference now to the drawings, and in particular to FIGS. 1 through 4 thereof, a new wheelbarrow device embodying the principles and concepts of an embodiment of the disclosure and generally designated by the reference numeral 10 will be described.

As best illustrated in FIGS. 1 through 4, the powered wheelbarrow assembly 10 generally comprises a wheelbarrow 12 that includes a frame 14 and a bucket 16 that is hingedly coupled to the frame 14. The frame 14 includes a lower section 18 and an upper section 20 that is oriented at an angle with the lower section 18. Moreover, the upper section 20 slopes downwardly between a rear end 22 and a front end 24 of the upper section 20. The upper section 20 is curved upwardly adjacent to the front end 24 to define a support 25 for tipping the wheelbarrow 12 and the lower section 18 has a back end 26 and a forward end 28. A pair of grips 30 is each attached to the upper section 20 adjacent to the rear end 22 to facilitate a user to grip the upper section 20 in the convention of a traditional wheelbarrow 12.

The bucket 16 has a lower side 32 and the lower side 32 is hingedly coupled to the upper section 20. The bucket 16 is positionable in a stowed position having the lower side 32 resting on the upper section 20 to carry cargo 33. Conversely, the bucket 16 is positionable in a tipped position having the lower side 32 being oriented at an angle with the upper section 20 to dump the cargo 33.

A pair of front wheels 34 is each rotatably coupled to the frame 14 for rolling on a support surface 36. Each of the front wheels 34 is positioned adjacent to the front end 24 of the lower section 18. Additionally, each of the front wheels 34 may include inflatable, rubber tires for enhancing the load capacity of the wheelbarrow 12. An axle 38 extends between each of the front wheels 34. A pair of rear wheels 40 is each pivotally coupled to the frame 14 for rolling on the support surface 36. Each of the rear wheels 40 is rotatable about a vertical axis for steering the wheelbarrow 12. Additionally, each of the rear wheels 40 is positioned adjacent to the back end 26 of the lower section 18.

A motor 42 is coupled to the frame 14 and the motor 42 is positioned on the lower section 18. The motor 42 may be an internal combustion motor that produces at least 8.0 ft/lbs of rotational torque. A drive unit 44 is movably coupled to the frame 14 and the drive unit 44 is in mechanical communication between the motor 42 and the front wheels 34. Moreover, the motor 42 rotates the front wheels 34 when the motor 42 is engaged. In this way the motor 42 reduces the effort required to transport a load in the wheelbarrow 12.

The drive unit 44 comprises a primary gear 46 that is rotatably coupled to the lower section 18 of the frame 14 and the primary gear 46 is positioned between the motor 42 and the front wheels 34. The primary gear 46 includes a reduction portion 48 comprising a plurality of teeth 50. The drive unit 44 includes a belt 52 extending around an output shaft 54 of the motor 42 and the primary gear 46 such that the motor 42 rotates the primary gear 46 when the motor 42 is engaged. The drive unit 44 includes a secondary gear 56 that is rotatably coupled to the lower section 18 of the frame 14. The secondary gear 56 engages the reduction portion 48 of the primary gear 46 such that the primary gear 46 rotates the secondary gear 56. Additionally, the secondary gear 56 has a reduction portion 58 comprising a chain sprocket 60. The drive unit 44 includes a drive gear 62 that is positioned around the axle 38. Additionally, the drive unit 44 includes a chain 64 extending around the reduction portion 58 of the secondary gear 56 and the drive gear 62 such that the secondary gear 56 rotates the drive gear 62 for rotating the front wheels 34.

A clutch 66 is movably coupled to the frame 14 and the clutch 66 is in mechanical communication with the drive unit 44. The clutch 66 engages the drive unit 44 when the clutch 66 is engaged thereby facilitating the motor 42 to propel the wheelbarrow 12. Conversely, the clutch 66 disengages the drive unit 44 when the clutch 66 is disengaged thereby inhibiting the motor 42 from propelling the wheelbarrow 12. The clutch 66 comprises a lever 68 that is pivotally coupled to the frame 14 and the lever 68 is positioned beneath the upper section 20 of the frame 14.

The lever 68 extends toward the rear end 22 of the upper section 20 such that the lever 68 can be gripped by a user. The lever 68 is positionable in an engaging position having the lever 68 being lifted upwardly with respect to the upper section 20. The lever 68 is positionable in a disengaging position having the lever 68 being lowered downwardly with respect to the upper section 20. A pulley 70 is coupled to the lever 68 and the pulley 70 engages the belt 52 of the drive unit 44. The pulley 70 tightens the belt 52 when the lever 68 is positioned in the engaging position thereby reducing slippage of the belt 52. Thus, the motor 42 can propel the wheelbarrow 12. Conversely, the pulley 70 loosens the belt 52 when the lever 68 is positioned in the disengaging position thereby increasing slippage of the belt 52. In this way the motor 42 is inhibited from propelling the wheelbarrow 12.

In use, the bucket 16 is loaded with the cargo 33 and the motor 42 is turned on. The lever 68 is gripped to position the lever 68 in the engaging position to propel the wheelbarrow 12. In this way the cargo 33 can be transported with minimal effort from the user. The lever 68 is released to position the lever 68 in the disengaging position to cease propelling the wheelbarrow 12. The grips 30 are lifted to tip the wheelbarrow 12 forwardly thereby facilitating the bucket 16 to hinge into the tipped position for dumping the cargo 33. In this way stone masons and construction laborers can more easily transport heavy cargo 33 compared to a traditional wheelbarrow 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A powered wheelbarrow assembly comprising:
   a wheelbarrow including a frame and a bucket being hingedly coupled to said frame, said frame including a lower section and an upper section being oriented at an angle with said lower section, said upper section sloping downwardly between a rear end and a front end of said upper section;
   a pair of front wheels, each of said front wheels being rotatably coupled to said frame wherein each of said from wheels is configured to roll on a support surface, wherein said upper section is curved upwardly adjacent to said front end forward of said pair of front wheels to define a support for tipping said wheelbarrow, said lower section having a back end and a forward end, said bucket having a lower side, said lower side being hingedly coupled to said upper section wherein said bucket is pivotable to tip forwardly into contact with said support;
   a pair of rear wheels, each of said rear wheels being pivotally coupled to said frame wherein each of said rear wheels is configured to roll on the support surface, each of said rear wheels being rotatable about a vertical axis for steering said wheelbarrow;
   a motor being coupled to said frame, said motor being positioned on said lower section;
   a drive unit being movably coupled to said frame, said drive unit being in mechanical communication between said motor and said from wheels such that said motor rotates said front wheels when said motor is engaged wherein said motor is configured to reduce the effort required to transport a load in said wheelbarrow; and
   a clutch being movably coupled to said frame, said clutch being in mechanical communication with said drive unit, said clutch engaging said drive unit when said clutch is engaged thereby facilitating said motor to propel said wheelbarrow, said clutch disengaging said drive unit when said clutch is disengaged thereby inhibiting said motor from propelling said wheelbarrow.

2. The assembly according to claim 1, wherein said bucket is positionable in a stowed position having said lower side resting on said upper section wherein said bucket is configured to carry cargo, said bucket being positionable in a tipped position having said lower side being oriented at an angle with said upper section and said lower side contacting said support wherein said bucket is configured to dump the cargo.

3. The assembly according to claim 1, wherein said drive unit comprises a primary gear being rotatably coupled to said lower section of said frame, said primary gear being positioned between said motor and said front wheels, said primary gear including a reduction portion comprising a plurality of teeth.

4. The assembly according to claim 3, wherein said drive unit includes a belt extending around an output shaft of said motor and said primary gear such that said motor rotates said primary gear when said motor is engaged.

5. The assembly according to claim 4, wherein said drive unit includes a secondary gear being rotatably coupled to said lower section of said frame, said secondary gear engaging said reduction portion of said primary gear such that said primary gear rotates said secondary gear, said secondary gear having a reduction portion comprising a chain sprocket.

6. The assembly according to claim 5, wherein:
said assembly includes an axle extending between each of said front wheels;
said drive unit includes a drive gear being positioned around said axle; and
said drive unit includes a chain extending around said reduction portion of said secondary gear and said drive gear such that said secondary gear rotates said drive gear for rotating said front wheels.

7. The assembly according to claim 1, Wherein said clutch comprises a lever being pivotally coupled to said frame, said lever being positioned beneath said upper section of said frame, said lever extending toward said rear end of said upper section wherein said lever is configured to be gripped by a user, said lever being positionable in an engaging position having said lever being lifted upwardly with respect to said upper section, said lever being positionable in a disengaging position having said lever being lowered downwardly with respect to said upper section.

8. The assembly according to claim 7, wherein said clutch comprises a pulley being coupled to said lever, said pulley engaging a belt of said drive unit, said pulley tightening said belt when said lever is positioned in said engaging position thereby reducing slippage of said belt thereby facilitating said motor to propel said wheelbarrow, said pulley loosening said belt when said lever is positioned in said disengaging position thereby increasing slippage of said belt thereby inhibiting said motor from propelling said wheelbarrow.

9. A powered wheelbarrow assembly comprising:
a wheelbarrow including a frame and a bucket being hingedly coupled to said frame, said frame including a lower section and an upper section being oriented at an angle with said lower section, said upper section sloping downwardly between a rear end and a front end of said upper section, said upper section being curved upwardly adjacent to said front end to define a support for tipping said Wheelbarrow, said lower section having a back end and a forward end, said bucket having a lower side, said lower side being hingedly coupled to said upper section wherein said bucket is pivotable to tip forwardly into contact with said support, said bucket being positionable in a stowed position having said lower side resting on said upper section wherein said bucket is configured to carry cargo, said bucket being positionable in a tipped position having said lower side being oriented at an angle with said upper section and said lower side contacting said support wherein said bucket is configured to dump the cargo;
a pair of front wheels, said support being positioned forwardly of said front wheels, each of said front wheels being rotatably coupled to said frame wherein each of said front wheels is configured to roll on a support surface, each of said front wheels being positioned adjacent to said front end of said lower section;
an axle extending between each of said front wheels;
a pair of rear wheels, each of said rear wheels being pivotally coupled to said frame wherein each of said rear wheels is configured to roll on the support surface, each of said rear wheels being rotatable about a vertical axis for steering said wheelbarrow, each of said rear wheels being positioned adjacent to said back end of said lower section;
a motor being coupled to said frame, said motor being positioned on said lower section;
a drive unit being movably coupled to said frame, said drive unit being in mechanical communication between said motor and said front wheels such that said motor rotates said front Wheels when said motor is engaged wherein said motor is configured to reduce the effort required to transport a load in said wheelbarrow, said drive unit comprising:
a primary gear being rotatably coupled to said lower section of said frame, said primary gear being positioned between said motor and said front wheels, said primary gear including a reduction portion comprising a plurality of teeth;
a belt extending around an output shaft of said motor and said primary gear such that said motor rotates said primary gear when said motor is engaged;
a secondary gear being rotatably coupled to said lower section of said frame, said secondary gear engaging said reduction portion of said primary gear such that said primary gear rotates said secondary gear, said secondary gear having a reduction portion comprising a chain sprocket;
a drive gear being positioned around said axle; and
a chain extending around said reduction portion of said secondary gear and said drive gear such that said secondary gear rotates said drive gear for rotating said front wheels; and
a clutch being movably coupled to said frame, said clutch being in mechanical communication with said drive unit, said clutch engaging said drive unit when said clutch is engaged thereby facilitating said motor to propel said wheelbarrow, said clutch disengaging said drive unit when said clutch is disengaged thereby inhibiting said motor from propelling said wheelbarrow, said clutch comprising:
a lever being pivotally coupled to said frame, said lever being positioned beneath said upper section of said frame, said lever extending toward said rear end of said upper section wherein said lever is configured to be gripped by a user, said lever being positionable in an engaging position having said lever being lifted upwardly with respect to said upper section, said lever being positionable in a disengaging position having said lever being lowered downwardly with respect to said upper section; and a pulley being coupled to said lever, said pulley engaging said belt of said drive unit, said pulley tightening said belt when said lever is positioned in said engaging position thereby reducing slippage of said belt thereby facilitating said motor to propel said wheelbarrow, said pulley loosening said belt when said lever is positioned in said disengaging position thereby increasing slippage of said belt thereby inhibiting said motor from propelling said wheelbarrow.

\* \* \* \* \*